United States Patent [19]

Huschka et al.

[11] 4,060,497
[45] Nov. 29, 1977

[54] PROCESS FOR THE PRODUCTION OF SPHERICAL FUEL AND FERTILE PARTICLES

[75] Inventors: Hans Huschka, Hanau; Martin Kadner, Maintal, both of Germany

[73] Assignee: HOBEG Hochtemperaturreaktor-Brennelement GmbH, Hanau, Germany

[21] Appl. No.: 638,662

[22] Filed: Dec. 8, 1975

[30] Foreign Application Priority Data

Dec. 16, 1974 Germany .................... 2459445

[51] Int. Cl.² ........................... C01G 43/02
[52] U.S. Cl. ........................ 252/301.1 S; 264/.5
[58] Field of Search ............... 252/301.1 D; 264/.5

[56] References Cited

U.S. PATENT DOCUMENTS

| 3,275,744 | 9/1966 | Dietrich | 356/23 |
| 3,886,086 | 5/1975 | Simpson et al. | 252/301.1 S |
| 3,933,679 | 1/1976 | Weitzel et al. | 252/301.1 S |

FOREIGN PATENT DOCUMENTS

| 2,143,394 | 2/1973 | France. |
| 2,135,598 | 2/1973 | France. |

Primary Examiner—Benjamin R. Padgett
Assistant Examiner—Deborah L. Kyle
Attorney, Agent, or Firm—Cushman, Darby & Cushman

[57] ABSTRACT

Uniform spherical fuel and/or fertile particles are formed by conversion of an oscillating liquid stream of a uranium and/or thorium compound solution flowing from at least one nozzle in an amount of more than 3,000 drops per minute by allowing these drops to fall into an ammonia solution and subsequently drying and sintering the particles thus formed. Before immersion in the ammonia solution the drops are first allowed to pass through a falling zone free of ammonia, this zone is so regulated that the drops have taken on their exact spherical form and then the drops are passed through a second falling zone containing flowing ammonia gas, whereby the ammonia gas is introduced into this second falling zone through at least one inlet conduit in such manner that there is guaranteed not only an ammonia gas flow in the opposite direction to that of the falling drops but also a horizontal cross current of the ammonia gas through the space between the drops and this second falling zone is so regulated that the spherical drops are sufficiently hardened before immersion in the ammonia solution.

7 Claims, 1 Drawing Figure

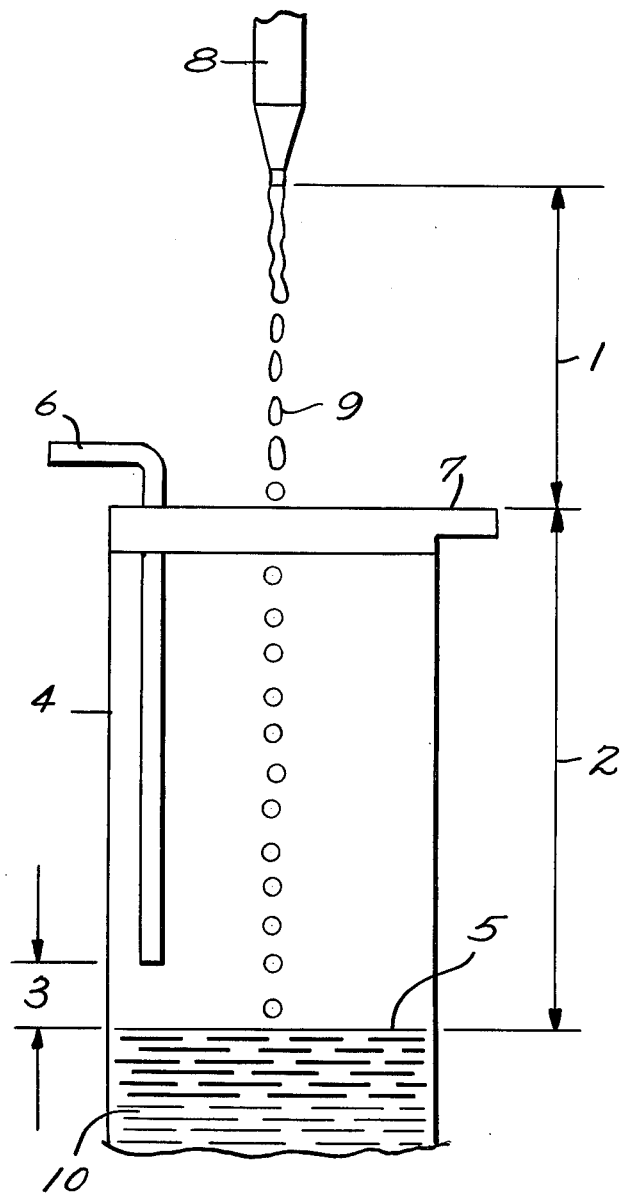

PROCESS FOR THE PRODUCTION OF SPHERICAL FUEL AND FERTILE PARTICLES

The invention is directed to a process for the production of uniform spherical fuel and/or fertile particles with a high throughput by casting uranium and/or thorium compound containing solutions from a nozzle set in vibration into an ammoniacal precipitation bath with subsequent drying and sintering of the formed and solidified drops.

All fuel elements for high temperature reactors contain the fuel and fertile material in the form of coated particles. These coated particles consist of uniform spherical particles of the oxide or carbide of uranium and/or thorium which are jacketed by layers of pyrolytic carbon and silicon carbide in order to retain the fission products. At the present time essentially the following types of particles are of significance: uranium oxide ($UO_2$), uranium carbide ($UC_2$), thorium oxide ($ThO_2$) and uranium-thorium oxide mixed crystals $(U,Th)O_2$. According to the requirement the particles are between 200 and 600$\mu$, the density should be as high as possible.

In the further progress of the production of fuel elements these fuel and fertile material nuclei were provided with coatings of pyrolytic carbon and silicon carbide which serve to retain the fission products in the operation of the reactor. Thereby the fission gas pressure occurring in the particle interiors, the strains formed by neutron emission and the stresses caused by temperature changes must be intercepted by these layers. This is best possible if these layers are precise spherical shells. For these reasons, extreme demands are placed on the spherical form of the particles, especially there are not permitted to occur peaks, just as in a drop, no contracting or flattening.

For the production of such particles there have been developed both granulation processes and also so-called wet processes. The latter for various reasons were preferred. These wet processes for the production of fuel and fertile material particles from uranium and thorium oxide have a fundamental idea in common. A solution or a sol is produced which contains a uranium and/or thorium compound. From these solutions spherical drops are formed which must be solidified while retaining the spherical form. The solidification takes place either by removal of water from the drops as in the sol-gel process, Clinton et al U.S. Pat. No. 3,290,122, by reaction of polymer solution additives with an alkaline medium, Brambilla German Pat. No. 1,212,841, or by ammoniacal precipitation in the drops, Fleichhauer et al German Auslegeschrift No. 1,542,346, or related Hackstein et al U.S. Pat. No. 3,535,264. Essentially two ways have previously been adopted for the formation of drops. The simplest method is to pass the solution out of a capillary and to let the drops draw off at the peak of the capillary. The drops fall into an alkaline solution in which the solidification takes place, Neri German Auslegeschrift No. 1,671,051. The rate of flow of the solution out of the capillary and the speed of drop formation is, to be sure, very small in this method. According to another method the solution stream from a nozzle directly enters into a liquid phase which is immiscible with the solution and in which the solvent stream splits into individual drops because of the surface tension. Thus, for example, in the sol-gel process the aqueous solution enters ethyl hexanol, in another process into paraffin oil, Nickel et al German Auslegeschrift No. 1,960,289. However, even in these processes because of the difficulty to control flow ratios of liquid into liquid there are only a small number of drops or particles per unit of time.

The throughput for a fixed process is given by the number of drops per unit of time which for an industrial production must be as high as possible for economical reasons. If one takes for the named casting method the number of drops per second to be of the order of magnitude of 10 then there can be produced from $(U,Th)O_2$ particles with an average diameter of about 400$\mu$ and an average particle weight of about 0.3 mg per hour and per nozzle about 11 grams of particles. With particles having a diameter of about 200$\mu$ there is only a throughput of about 1.5 grams of particles per hour per nozzle. A process with such low throughputs is not suited for production. Therefore there have been attempts to increase the throughput through employing a large number of nozzles and by various constructions of the nozzles. However, because of increase in the susceptibility to disturbances and reduction of the yield because of the broadening of the particle spectrum the economy of the process can barely be improved.

The throughput according to a casting process can be described by the following equation:

$$Q = K \cdot \frac{\Theta \cdot \rho_p}{C_{L_{sg}}} \cdot d_p^3$$

in which Q is the amount of throughput, $\nu$ the number per second of particles formed, $\rho_p$ and $d_p$ the density and diameter of the particles and $C_{L_{sg}}$ the concentration of the casting solution of uranium and thorium. K is a constant.

If one starts with a given casting solution and a given end product then $C_{L_{sg}}$, $d_p$, $\rho_p$ likewise become constant and it can be seen that at an increase of the throughput with increasing Q $\nu$ also must be greater. This consideration could not previously be realized because the stream leaving a nozzle under pressure in the gas phase (air or an inert gas, e.g., nitrogen or argon) is distributed partially sprayed apart, partially in non-uniform large drops which are deformed on the surface by the alkaline soluble present for solidification or are changed into flocks. By improvement of the nozzle form and vibrating system the spraying apart of the stream in the gas phase can be prevented and there can be attained the formation of a large number of uniform large drops per second. However, until now the stabilization of the exact spherical form was difficult which made practically impossible the employment of the wet process for the production of fuel and fertile materials since the first formed spheres became deformed either in the further free falling in the gaseous atmosphere or again upon impinging on the surface of the alkaline solution. When attempts are made to form the drops in an ammonia gas interval and to let them fall there occur problems through clogging of the nozzle, or because of early solidification there are not obtained exact spherical shapes.

The problem of the present invention, therefore, was to develop a process for the production of uniform, spherical fuel and/or fertile particles from uranium and/or thorium (i.e., uranium and/or thorium compound) containing solutions in which a high throughput of at least 3,000 drops per minute is reached and the deformation of the first formed exactly spherical drops from the uranium and/or thorium containing solution both in the fall through the gas phase and also in the impinging on the alkaline solution is prevented. The throughput can be as high as 200.000 drops per minute, for example.

While nitrates are used in the working examples there can be used any other uranium and/or thorium compounds which are soluble in water but insoluble in ammonia solution. Thus there can be used any of the uranyl and thorium salts set forth in Hackstein et al U.S. Pat. No. 3,535,264, the entire disclosure of which is hereby incorporated by reference, and relied upon, e.g., there can be used the chlorides, oxychlorides, fluorides, sulphates, and acetates.

The problem was solved according to the invention by providing that the drops of uranium and/or thorium solution flowing out of one or more nozzles before contacting the ammonia solution first run through an ammonia gas free falling zone which is so regulated that the drops have taken on their actual spherical form and then the drops are passed through a second falling zone containing flowing ammonia gas, whereby the ammonia gas is introduced into this second falling zone through one or more inlet tubes in such manner that there is guaranteed not only an ammonia gas flow in the opposite direction to that of the falling drops (i.e., countercurrent flow) but also a horizontal cross current of the ammonia gas through the space between the drops and this second falling zone is so regulated that the spherical drops are sufficiently hardened before immersion in the ammonia solution.

Contrary to the general expectation that in the short residence time of the drops of less than 0.5 seconds in the ammonia gas space no influence could be expected on the form of the drops, it has been found according to the invention that this short time in concentrated, gaseous ammonia is sufficient to stabilize the spherical shape through chemical reaction and to completely exclude a deformation of the spherical particles upon impingement on the surface of the solution. Thereby the wet process for the production of fuel and fertile particles in combination with nozzles and oscillating systems which are suitable for the production of large numbers of drops per second can be employed for the production of these spherical particles. The throughput per hour per nozzle can be increased from 1.5 grams at $200\mu$ particles or 11 grams at $400\mu$ particles at high frequencies of 1200 or 200 Hertz, for example to 180 grams or 220 grams. With $500\mu$ $ThO_2$ particles it is even possible to reach a throughput of 1 kg per hour per nozzle.

To produce such great throughputs there must be produced an oscillating liquid stream which because of its harmonic oscillation disintegrates into a very large number of uniform drops per second. These discrete drops still oscillate for a fraction of a second, as can be detected with a stroboscope, while falling through the ammonia gas free falling zone (with an atmosphere of air or inert gas, e.g., nitrogen or argon) until they take on a spherical shape. If this falling zone is lengthened beyond this point, the spherical drops become deformed to streamline shaped drops by resistance to friction. An essential component of the process of the invention is that the falling drops at exactly the time at which they reach their spherical shape are fixed by contact with ammonia gas, so that deformation is no longer possible and that the further falling zone in ammonia gas is so chosen that a sufficient solidification is produced to prevent deformation of the spherical particles in contact with the surface of the ammonia solution. These critical points between ammonia gas free and ammonia gas containing falling zones can be determined stroboscopically and regulated.

The mere introduction of gaseous ammonia with an $NH_4OH$ solution to maintain the $NH_3$ concentration in the solution (Scheibe German Auslesgeschrift No. 1,235,279) is not suitable for stabilizing the spherical shape of falling drops with a diameter of 0.5 to 2.5 mm because there is not sufficient ammonia gas available. It was rather found according to the invention that the ammonia gas counter current flow must be so strong and must be so conducted that all falling particles are constantly washed with ammonia gas. Since the particle stream is carried down with air or inert gas, through suitable flow conditions preferably there must constantly be led fresh ammonia gas, between the individual drops, which distance according to the particle sequence is at most a few millimeters. Since by increasing the throughput the drops per minute are greater and the distance between the drops thereby becomes smaller, the ammonia gas must be so led that it is present in sufficient amount between the individual drops.

For this it is necessary that besides the increasing ammonia gas flow counter to the direction of the falling drops above all there must also be guaranteed a horizontal cross current through the space between the drops. These streams are produced especially by blowing in ammonia gas into the drop tube by means of nozzles or thin inlet tubes which are provided with fine bores of a few millimeters diameter. Thereby it is important that a radial flow also is effective over the entire length of the ammonia gas containing falling tube. Suitable ammonia gas flows can also be produced with the help of nozzle scrolls or annularly arranged tubes provided with fine bores.

The single Figure of the drawings is a schematic picture of an apparatus suitable for use in the invention.

As shown in the drawing it has been found advantageous to employ a simple apparatus. The apparatus consists of a falling tube 4 in which an ammonia solution can be kept at a constant level 5, an ammonia gas inlet tube 6 whose cross section is very small compared to that of falling tube 4 and a suction apparatus 7 at the top of the falling tube 4. The ammonia gas suction connection 7 lies diametrically opposite to the ammonia gas inlet tube 6. Above the falling tube 4 is arranged the nozzle 8 from which flows out the liquid to be changed. The oscillating liquid stream in the air falling zone 1 breaks down into drops 9 which solidify in the ammonia gas falling zone 2 and are collected in the ammonia solution 10. The ammonia gas is introduced through the inlet tube 6 which ends in the distance 3 from the surface of the ammonia solution and is suctioned off at the head of the falling tube 4 over a connection 7. The distance 3 is preferably held so short (about 50 to 150 mm) that the ammonia gas blows to the surface of the ammonia solution and produces a slight, scarcely noticeable wave motion which scatterly reflects the ammonia gas. It flows around the falling drops in such manner on all sides both from below upwardly and also cross to the falling direction and hardens the drops.

The necessary turbulence of the cross current is furthermore improved through the gas inlet tube 6 having a considerably smaller diameter than that of the falling tube 4 in which the ammonia gas flows upward. Preferably the ratio of the gas stream velocities in the inlet tube 6 and the falling tube 4 is from 100:1 to 200:1. However, this ratio can be varied.

Through corresponding selection of the distance 1 the falling drops are caught in the ammonia gas at the point in time in which they have taken on an exactly spherical shape. This distance can be determined stroboscopically and can be correspondingly regulated.

The distance 2 in the falling tube is so chosen that the spherically shaped particles can be sufficiently hardened and their spherical shape maintained in the impingement on the surface of the ammonia solution.

The ammonia gas flow in the falling tube in a direction opposite to that of the flow of the particles can be varied within wide limits. However, it must be guaranteed that the ammonia gas concentration in the environment of the drops is sufficient for solidification. It was found that for this purpose for each cm² of newly formed drop surface per minute there is needed an ammonia gas flow velocity in the falling tube between 0.05 and 2 cm/min; the best results are produced at 0.1 to 1 cm/min. The distance 1 according to the size and number of the drops amounts to 50 to 150 mm. The distance 2 likewise depends on the size and number of the drops but also depends on the chemical composition of the casting solution. In using solutions which react very quickly with ammonia (for example via ionic reactions) a falling path of about 150 to 300 mm is sufficient, with sols, emulsions or suspensions the falling path can amount to from one to several meters because of the slight reaction velocity, for example, via electrical change in potential or diffusion.

In the falling tube 4 there can also be arranged several nozzles 8 parallel to each other. So long as these nozzles are arranged sufficiently spaced from each other (5 to 10 mm) that their particle flows do not reciprocally influence each other, the given values of the ammonia gas velocity depending on the formed drop surface per minute is independent of the number of the nozzles employed.

As casting solution in the process of the invention for the production of particles there can be used in known manner true solutions, emulsions or sols. In case carbide particles are to be produced there must be contained in suspension in the casting solution carbon black or other finely dispersed carbon powder. There can also be mixed into the casting solution one or more organic materials which serve as filters, binders and drop stabilizers.

In the following four examples the production of three types of particles according to the invention are described in more detail.

Unless otherwise indicated all parts and percentages are by weight.

EXAMPLE 1

One liter of an aqueous solution which contains 120 grams of thorium as thorium nitrate and 40 grams of polyvinyl alcohol (PVA) was pressed through a nozzle having a diameter of 1.2 mm. By the influence of an oscillator on the liquid cross sectional to the direction of flow the stream running out because of the forced harmonic oscillation changes into discrete uniform drops in the air falling zone 1. The drops after they had taken up an exactly spherical shape after falling 120 mm were caught up in the falling zone 2 with ammonia gas and after a further 220 mm of falling collected in the ammonia solution as spherical particles. The distance 3 from the ammonia gas inlet tube to the ammonia solution surface amounted to 100 mm and the ratio of the ammonia gas flow velocities in the inlet tube 6 and falling tube 4 was 100:1.

The throughput amounted to 53.8 cm³ of casting solution per minute. Thereby there were produced per minute 5,936 uniform drops with a total surface area of 1,255 cm². The ammonia gas flow velocity in the falling tube 4 amounted to 318 cm/min corresponding to 0.25 cm/min per 1 cm²/min of newly formed drop surface.

The spherical particles were washed, dried and sintered by thermal treatment to $ThO_2$ spheres. From the thorium concentration of the casting solution, the throughput and the number of particles per minute the expected $ThO_2$ nucleus diameter at 100% theoretical density is calculated to be 616 and the weight per particle to be 1.223 mg. The corresponding measured values agreed quite well with the calculated values.

| | Measured | Calculated |
|---|---|---|
| Established amount of throughput (cm³/min) | 53.8 | — |
| Th-content of the liquid (g/l) | 120 | — |
| Number of drops/min | 5,936 | 6,000 |
| $ThO_2$-particle density (% theoretical density) | | |
| Average $ThO_2$-particle diameter ($\mu$) | 617 | 616 |
| Average $ThO_2$-particle weight (mg) | 1.215 | 1.223 |

In agreement with these measured values the sieve analysis showed a yield of 97.2% in the range 595–630 or of 99.1% in the range 580–630; the residue consisted of over and under sized particles.

The spherical shape of the particles was investigated microscopically and it was ascertained that the ratio of the largest to the smallest diameter with 80% of all particles was smaller than 1.05, with the residual 20% less than 1.10.

EXAMPLE 2

A solution containing 100 g/l of thorium as thorium nitrate, 20 g/l uranium as uranyl nitrate and 40 g/l of PVA was fed over 6 flow meters to 6 nozzles having diameters of 0.8 mm each. The 6 fluid streams flowing out each disintegrated into 12,000 drops per minute which were solidified in ammonia gas as in Example 1, caught in ammonia solution and then converted into $ThO_2 \cdot UO_2$-mixed oxide spheres. The air falling zone 1 was 130 mm, the ammonia gas falling zone 2 160 mm and the distance 3 from the ammonia gas inlet tube to the ammonia solution surface 50 mm.

The amount of throughput per nozzle was adjusted to 32.0 ± 0.8 cm³/min. This corresponds at 12,000 drops to a surface of 1115 cm² per minute per nozzle of newly formed drops, which are solidified by the ammonia gas flow of 318 cm/min established in the falling tube. The ammonia gas flow velocity per 1 cm²/min newly formed drop surface per nozzle was 0.29 cm/min, whereby of course it must be made certain that the nozzles or particle flows in the falling zone are not reciprocally influenced.

According to the preceding equation the expected $ThO_2 \cdot UO_2$ particle diameter from the named values calculate to 411 ± 3 at 100% of the theoretical density and the particle weight to 0.363 ± 0.008 mg. The statistical evaluation based on 300 sintered particles showed an average diameter of 410 and a standard deviation of 7.5. The $(Th,U)O_2$ particle weight was determined to be 0.3594 mg all the density 9.96 g/cm³ which is 98% of the theoretical density. The yield of sieve fraction 354–425 was 98.9%. The residue of 1.1% was over and under size.

The particles were coated with pyrolytic carbon and employed as nuclear fuel.

EXAMPLE 3

An aqueous solution which contained 180 g/1 of thorium as thorium nitrate and 25 g/1 PVA were fed over 5 flow meters to 5 nozzles of 1.0 mm diameter each. The 5 equal, oscillating liquid streams flowing out each formed in air 24,000 drops per minute which were caught up as in Example 1 in ammonia gas and were collected in ammonia solution as spherical particles. The air falling zone 1 was 80 mm, the ammonia gas falling zone 2 150 mm, the distance from the ammonia gas inlet tube to the ammonia surface 3 was 30 mm and the ammonia gas flow ratio of inlet to falling tube 120:1. The throughput per nozzle was 76.8 cm$^3$/min, corresponding to a drop surface of 2,525 cm$^2$/min. The ammonia gas counter current flow was adjusted to 255 cm/min. Therefrom there resulted an ammonia gas flow velocity of 0.1 cm/min per cm$^2$/min of newly formed drop surface per nozzle.

The particles were washed, dried and sintered to form ThO$_2$ spheres. The throughput was 943 grams of ThO$_2$ per hour per nozzle. According to the preceding equation the diameter of the sintered particles were calculated to be 500 at 100% theoretical density. Based on the statistical evaluation of 1,507 particles the average particle diameter was fixed at 503 with a 14 standard deviation. The measured density was 99.5% of that theoretically possible. More than 98% of the particles had a ratio of largest to smallest diameter of less than 1.1:1.

EXAMPLE 4

An aqueous suspension which contained 120 g/1 of uranium as uranyl nitrate, 20 g/1 of PVA, 180 g/1 of urea and 24 g/1 of carbon black was fed over 2 flow meters to 2 nozzles, each having a diameter of 0.25 mm. In a manner similar to Example 1 both oscillating liquid streams were changed in air to uniform drops which were caught in ammonia gas and hardened sufficiently that they could be collected in ammonia solution. The air falling zone 1 was 80 mm, the ammonia gas falling zone 2 280 mm, the distance between the ammonia gas inlet tube and the aqueous ammonia surface 3 150 mm and the ammonia gas flow ratio of inlet tube to falling tube 120:1.

There flowed from each nozzle per minute 23.0 cm$^3$ of casting suspension which changed into 72,000 drops/min and formed a drop surface of 1,635 cm$^2$/min, for which there was established an ammonia counter directional flow of 255 cm/min. Converting this shows an ammonia gas flow velocity of 0.16 cm/min for each cm$^2$ of newly formed drop surface per minute per nozzle. The spherical particles were washed, dried and changed into UC$_2$ particles by thermal treatment. At the expected density of 10.2 g/cm$^3$ (90% of the theoretical density) the diameter should be 200. In agreement therewith the particle density was measured as 10.5 g/cm$^3$ and the average particle diameter based on a representative sample of 100 particles statistically was fixed at 198 with the standard deviation being 7.

The sintering in the examples is carried out at a conventional temperature, e.g., 1500° C for oxides and 1800° C for carbides.

The process can comprise, consist essentially of, or consists of the steps set forth.

What is claimed is:

1. A process of forming uniform spherical particles of fuel particles, fertile particles or a mixture of fuel and fertile particles comprising flowing an oscillating liquid stream comprising a solution of a uranium compound, a thorium compund or a mixture of a uranium compound and a thorium compound from at least one nozzle at a rate of at least 3,000 drops per minute, determining the boundary between a first falling zone free of ammonia and a second falling zone containing ammonia by stroboscopically measuring the roundness of the drops, passing the drops through said first falling zone free of ammonia, regulating the length of the first falling zone so that the drops have just taken on an exact spherical form, then passing the drops through a second falling zone containing ammonia flowing both countercurrently to the falling drops and also horizontally cross currently to the drops in an amount guaranteeing that the space between the drops is filled with ammonia, the length of said second falling zone being 150 to 300 mm and being so regulated that the spherical drops are sufficiently hardened before immersion in an ammonia solution directly below said second zone that they are not deformed by contact with said solution and then passing said hardened drops from said second zone into said ammonia solution.

2. The process of claim 1 including the steps of removing the hardened drops from the ammonia solution, drying them and heating them sufficiently to sinter them.

3. The process of claim 1 wherein the ammonia gas is introduced into said second zone at a point near the lower end thereof.

4. The process of claim 1 wherein the drops are flowed at a rate of 3,000 to 72,000 drops per minute per nozzle.

5. The process of claim 1 wherein the drops have a diameter between 0.5 and 2.5 mm and the flow of the ammonia gas stream counter to the direction of fall of the drops is at a flow velocity of 0.05 to 2 cm/min per cm$^2$ of newly formed drop surface per minute per nozzle.

6. The process of claim 1 wherein the ratio of velocity of ammonia gas in the ammonia gas inlet tube to the ratio of velocity of ammonia gas in the second falling zone is from 100:1 to 200:1.

7. The process of claim 1 wherein the length of the first falling zone is 50 to 150 mm.

* * * * *